(12) United States Patent
Saito et al.

(10) Patent No.: US 6,477,173 B1
(45) Date of Patent: Nov. 5, 2002

(54) SYSTEM FOR SWITCHING HIGH-CAPACITY AND VARIABLE LENGTH PACKETS

(75) Inventors: Tadao Saito, Yokohama; Hitoshi Aida, Kawasaki; Terumasa Aoki, Kamifukuoka, all of (JP)

(73) Assignee: The University of Tokyo (JP)

( * ) Notice: Subject to any disclaimer, the term of this patent is extended or adjusted under 35 U.S.C. 154(b) by 0 days.

(21) Appl. No.: 09/161,411

(22) Filed: Sep. 24, 1998

(30) Foreign Application Priority Data

Mar. 20, 1998 (JP) .......................................... 10-071814

(51) Int. Cl.[7] .......................... H04L 12/28; H04L 12/56
(52) U.S. Cl. ...................................................... 370/411
(58) Field of Search ................................ 370/357, 389, 370/392, 400, 401, 402–405, 406, 411, 386

(56) References Cited

U.S. PATENT DOCUMENTS

| | | | |
|---|---|---|---|
| 4,866,701 A | * | 9/1989 | Giacopelli et al. .......... 370/411 |
| 5,287,346 A | * | 2/1994 | Bianchini et al. ........... 370/390 |
| 5,467,211 A | * | 11/1995 | Haney et al. ............... 359/117 |
| 5,940,367 A | * | 8/1999 | Antonov ...................... 370/218 |
| 6,055,233 A | * | 4/2000 | Park ............................ 370/388 |

* cited by examiner

*Primary Examiner*—Kwang Bin Yao
*Assistant Examiner*—Kevin C. Harper
(74) *Attorney, Agent, or Firm*—Venable; Robert J. Frank; Jeffri A. Kaminski

(57) ABSTRACT

In a system for switching high-capacity and variable length packets from m input ports to n output ports, k Banyan networks are connected into a ring by means of at least n parallel lines, said input ports are connected to inputs of said Banyan networks in a dispersed manner by means of m input modules, misroute tag check parts are connected to outputs of said Banyan networks as well as to inputs of n output modules whose outputs are connected to said output ports. Each of plural unit switches constituting a Banyan network is constructed such that when an input packet cannot be sent to a desired output, the relevant packet is outputted to a non-occupied output of the relevant Banyan network. When the misroute tag check part finds that the misroute tag is set, the relevant packet is sent to a next stage Banyan network, but when the misroute check tag is not set, the relevant packet is outputted to an output module connected to a desired output. The input module stores a packet from the input port and a packet from a misroute tag check part and sends one of these packets selectively to a succeeding Banyan network.

5 Claims, 9 Drawing Sheets

BLOCKING

SYSTEM FOR SWITCHING HIGH-CAPACITY AND VARIABLE LENGTH PACKETS

BACKGROUND OF THE INVENTION

1. Field of the Invention

The invention relates to a system for switching high-capacity and variable length packets from plural input ports to plural output ports.

2. Related Art Statement

A common bus system is currently used in most major IP(internet protocol) routers and has been used in almost all commercially available IP routers. FIG. 1 shows diagrammatically a packet switch of the common bus system. Each of plural input ports gets or acquires a right of using a common bus according to the round robin method and sends or broadcasts a packet on to the common bus. Each of plural outputs ports receives a broadcast packet addressed to the relevant output port. Therefore, in order to make a packet loss within the router to be zero, an operation speed of the common bus should be not lower than a value represented by (a transmission speed of each ports)×(the number of the ports).

The common bus system has advantages that variable-length packets can be exchanged and the number of circuit elements constituting the router can be reduced, but the transmission speed of the common bus must be increased in proportion to an increase in the number of the input and output ports. Therefore, due to physical limits of circuit elements, it is very difficult to realize a mass switching system having a bit rate more than one Tbps (terabit per second) by means of the common bus system.

FIG. 2 shows a Banyan network by means of which a mass switch can be realized by connecting unit switches in a multiple-stage mode. In the Banyan network, transmission paths exist between each of the input ports and all the output ports.

The Banyan network is suitable to realize the high-speed and high-capacity packet switching system, because all the unit switches within the Banyan network operate in parallel. However, as shown in FIG. 3, it has a drawback that when plural packets are inputted into the same input port, undesired internal blocking occurs. In FIGS. 2 and 3, the unit switch is formed by a 2×2 unit switch, but 4×4 unit switch, 8×8 unit switch, 16×16 unit switch and so on may be used to realize similar packet switching systems.

In order to reduce the internal blocking in the Banyan network, there has been proposed a tandem Banyan network. In this tandem Banyan network, plural Banyan networks are arranged in tandem as shown in FIG. 4. In the tandem Banyan network, all the packets are inputted to a first stage Banyan network among the Banyan networks (in FIG. 4, the most left-hand side Banyan network), and when the internal blocking occurs in this first stage Banyan network, a misroute tag is set on the relevant packet and the packet is outputted to an empty output port which is not occupied by other packet. In this manner, after the packet has passed through the first stage Banyan network, the packet is inputted to a second stage Banyan network of the tandem Banyan network. On the other hand, a packet which has succeeded to be outputted to a desired or denoted output port of the first stage Banyan network is sent to an output buffer without passing through the remaining Banyan networks.

As explained above, in the tandem Banyan network, upon the occurrence of an internal blocking, a packet can be inputted to a succeeding one or more Banyan networks until the relevant packet arrives at a desired or destined output ports, and therefore almost all internal blockings can be avoided. In other words, in the tandem Banyan network, an internal blocking could not be avoided only when misroute tags are set at all the Banyan networks from the first stage to the last stage.

The tandem Banyan network is a valuable means for reducing the internal blocking in the Banyan network. However, in the tandem Banyan network, all packets are first inputted to the first stage Banyan network, and when an internal blocking might occur in the first stage Banyan network, the relevant packet is inputted to the second stage Banyan network and so on. Therefore, when an input traffic is large, a rate of occurrence of internal blocking in the first stage Banyan network becomes high and this results in an increase of a rate at which packets are inputting to Banyan networks after the second stage. This might cause an increase in a switching delay as well as an increase in a fluctuation of the switching delay. Furthermore, there might arise a problem that a rate of occurrence of a wrong order of packets is increased in accordance with the increase in a fluctuation of switching delay.

SUMMARY OF THE INVENTION

It is an object of the invention to provide a novel and useful system for switching high-capacity and variable length packets, in which the above mentioned problems in the known tandem Banyan network can be mitigated and a rate of occurrence of internal blocking can be reduced and the switching delay and the delay fluctuation can be decreased.

According to the present invention, a system for switching high-capacity and variable length packets comprises:

m (plural) input ports;

n (plural) output ports;

k (plural) Banyan networks connected into a ring by means of at least n parallel lines, each Banyan network having at least n inputs and at least n outputs;

m input modules each of which is connected to a respective one of said m input ports, said input modules being further connected to said inputs of said k Banyan networks;

m sets of misroute tag check parts, each set including at least n misroute tag check parts, respective misroute tag check parts in each set being connected to respective outputs of each Banyan networks; and n output modules each having an output connected to a respective one of said output ports and inputs each connected to one of misroute tag check parts of each set;

wherein each of plural unit switches constituting a Banyan network is constructed such that when an input packet cannot be sent to a desired output, the relevant packet is outputted to a non-occupied output of the relevant Banyan network, said misroute tag check part checks whether a misroute tag of an inputted packet is set or not, and when the misroute tag is set, the relevant packet is sent to a next stage Banyan network, but when the misroute check tag is not set, the relevant packet is outputted to an output module connected to a desired output; and said input module is constructed to store a packet from the input port and a packet from a misroute tag check part and to send one of these packets selectively to a Banyan network of a next stage.

In the packet switching system according to the invention, as shown in FIG. 5, plural Banyan networks are connected in the form of a ring and plural input ports are connected to these Banyan networks in a dispersed manner. Thus, an input traffic is dispersed and an apparent input traffic of each Banyan networks can be reduced. For example, provided the number of the Banyan networks is N, in the known tandem Banyan network, a total amount of traffic is inputted into the Banyan network of the first stage, but in the packet switching system according to the invention, it is sufficient that each Banyan network receive 1/N of the total traffic amount. In this manner, the input traffic is dispersed among a plurality of Banyan networks connected into a ring. Due to this dispersing effect, an apparent input traffic to each of the Banyan networks is reduced, and thus a rate of occurrence of the internal blocking in Banyan networks is decreased as compared with the tandem Banyan network and a packet switching delay and a fluctuation of the packet switching delay can be decreased.

DETAILED DESCRIPTION OF PREFERRED EMBODIMENT

Figure 6:
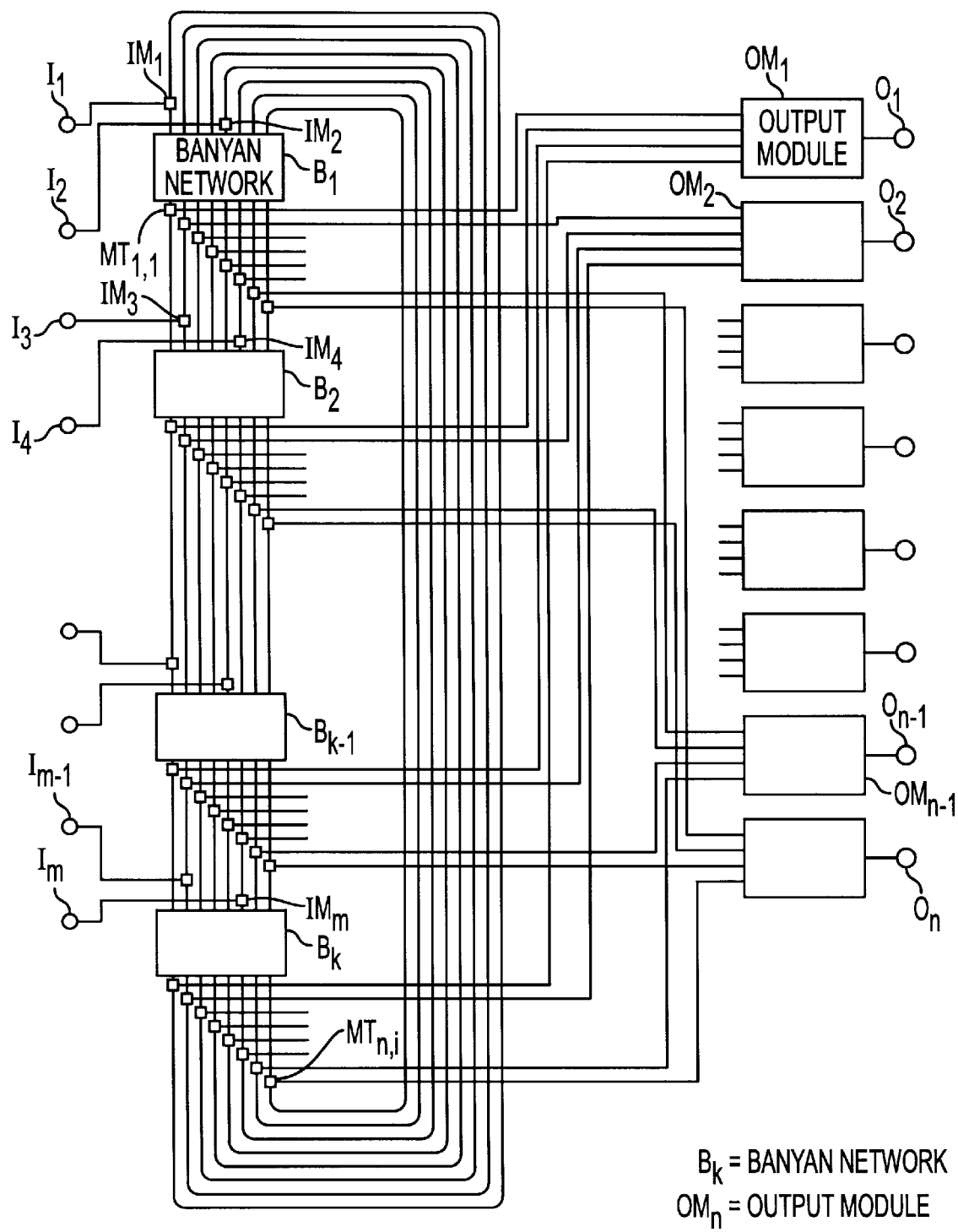
FIG. 6 is a block diagram illustrating an embodiment of the packet switching system according to the invention.
Figure 7:
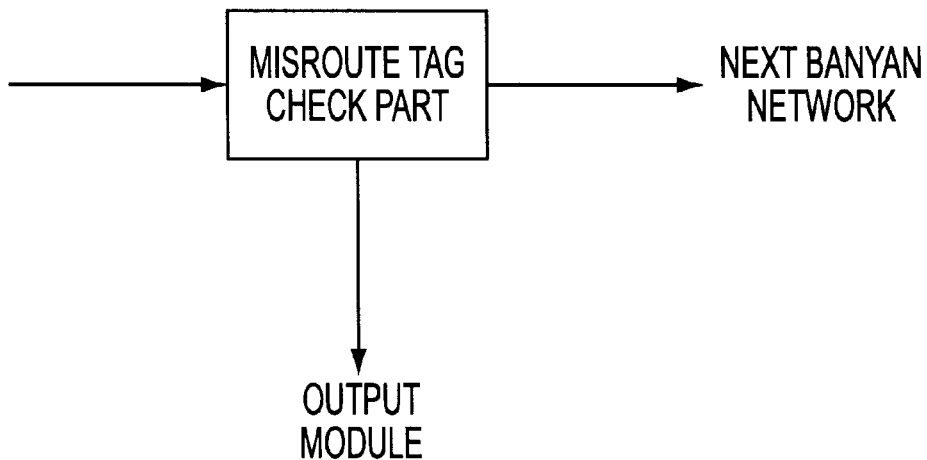
FIG. 7 is a block diagram showing a detailed construction of a misroute tag check part of the packet switching system shown in FIG. 6.

FIG. 6 is a block diagram showing an embodiment of the packet switching system according to the invention. The packet switching system comprises m input ports $I_h$ (h=1, 2, ..., m) and m input modules $IM_h$ (h=1, 2, ..., m), said input ports $I_h$ are connected to said input modules $IM_h$. In the present embodiment, first two input ports $I_1$ and $I_2$ are connected to a first input module $IM_1$, and a second input module $IM_2$, respectively, the second two input ports $I_3$ and $I_4$ are connected to a third input module $IM_3$ and a fourth input module $IM_2$, respectively, and so on. The packet switching system further comprises k Banyan neworks $B_i$ (i=1, 2, ..., k) each of which includes n outputs, n×i misroute tag check parts $MT_{h,i}$ and n output modules $OM_j$ (j=1, 2, ..., n) each connected to respective output ports $O_j$.

In the embodiment shown in FIG. 6, it is assumed that m=n=8 and k=4, but these numbers may be set to any desired values.

Figure 1:
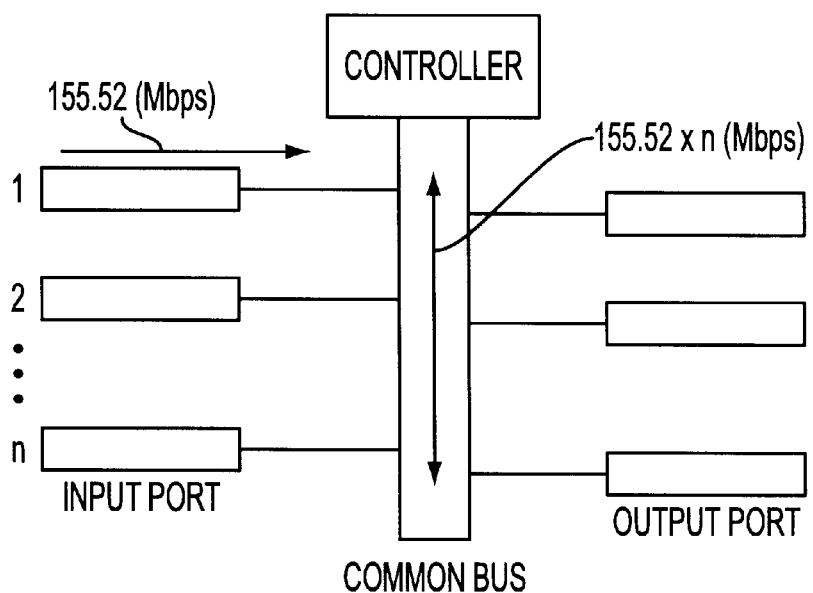
FIG. 1 is a block diagram showing a known packet switch of the common bus system.
Figure 2:
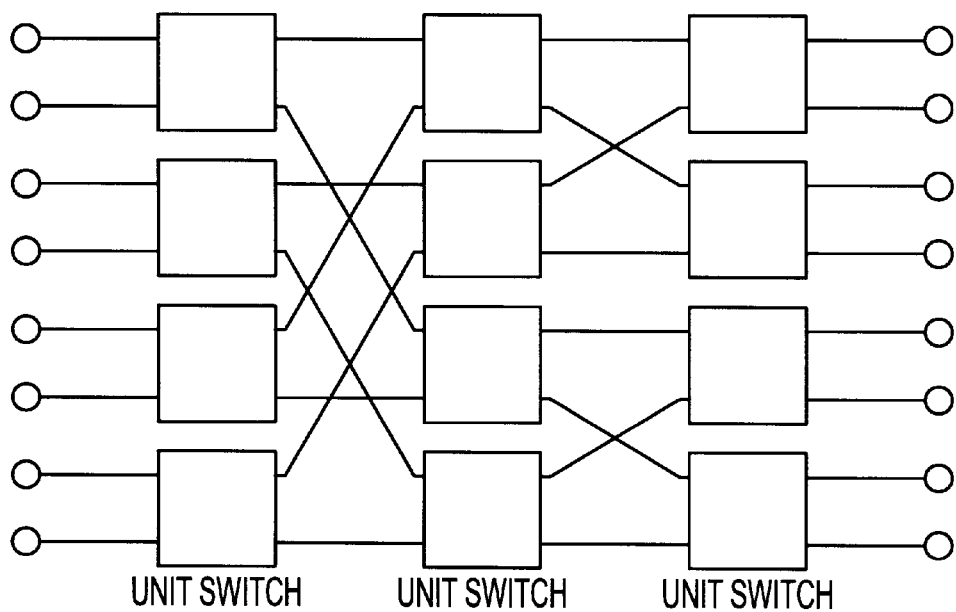
FIG. 2 is a block diagram illustrating the Banyan network.
Figure 3:
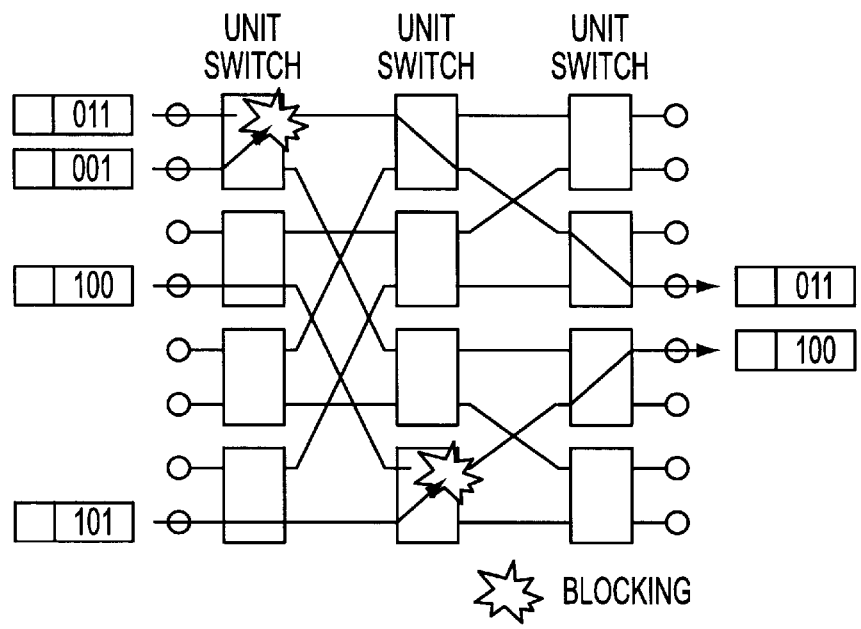
FIG. 3 is a schematic view representing an occurrence of internal blocking in the Banyan network.
Figure 4:
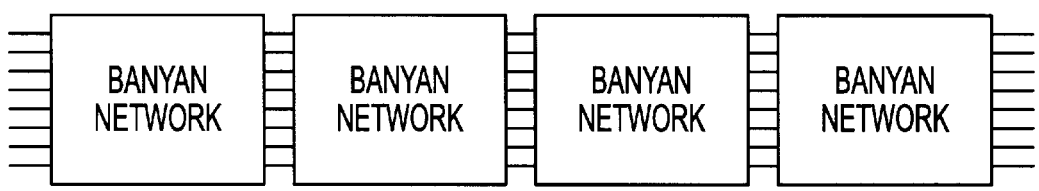
FIG. 4 is a block diagram depicting the known tandem Banyan network.
Figure 5:
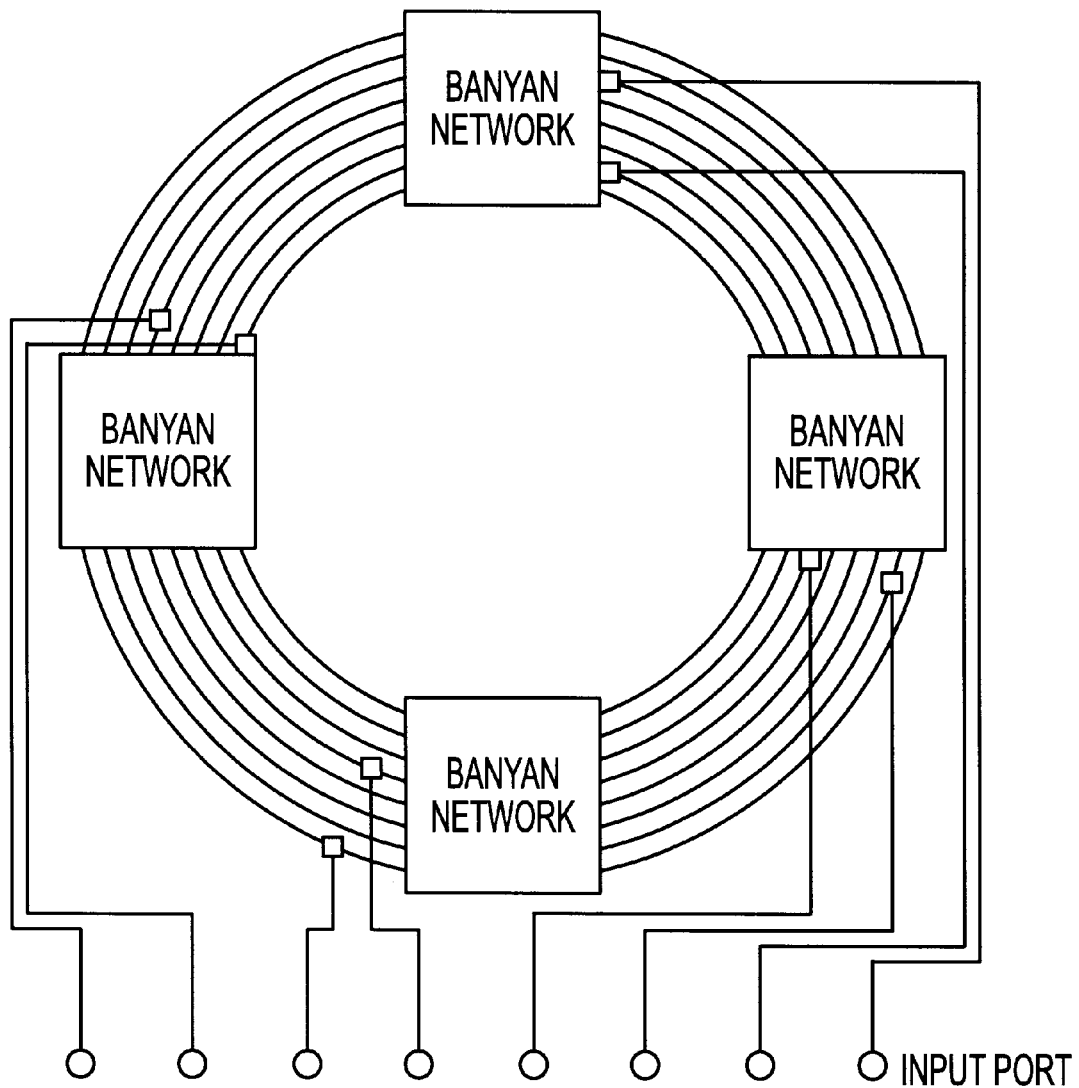
FIG. 5 is a block diagram showing a basic structure of the packet switching system according to the invention.

The Banyan network $B_i$ can achieve the high-capacity switching by arranging a number of unit switches in a multiple-stage connection as shown in FIG. 2. When a packet cannot be sent to an output of a Banyan network leading to a desired output port $O_j$, each unit switch sets a misroute tag of the relevant packet and sends this packet to an empty output. In FIG. 2, although the Banyan network is composed of 2×2 unit switches, similar multiple-stage connections may be realized by using 4×4, 8×8, 16×16 or 32×32 unit switches. The numbers of the inputs and outputs of each of the Banyan networks must be at least the number n of the output ports. The Banyan networks are connected in the form of ring by means of at least n lines. In this embodiment, it is assumed that the packets run in a counterclockwise direction along the Banyan networks connected in the form of ring.

The misroute tag check part $MT_{h,i}$ has a 1×2 switching function. The misroute tag check part checks whether the misroute tag of an input packet is set or not, and when the misroute tag is set, the relevant packet is switched to a succeeding Banyan network $B_i$ and when the misroute tag is not set, the packet is sent to an output module $O_{mj}$.

Figure 8:
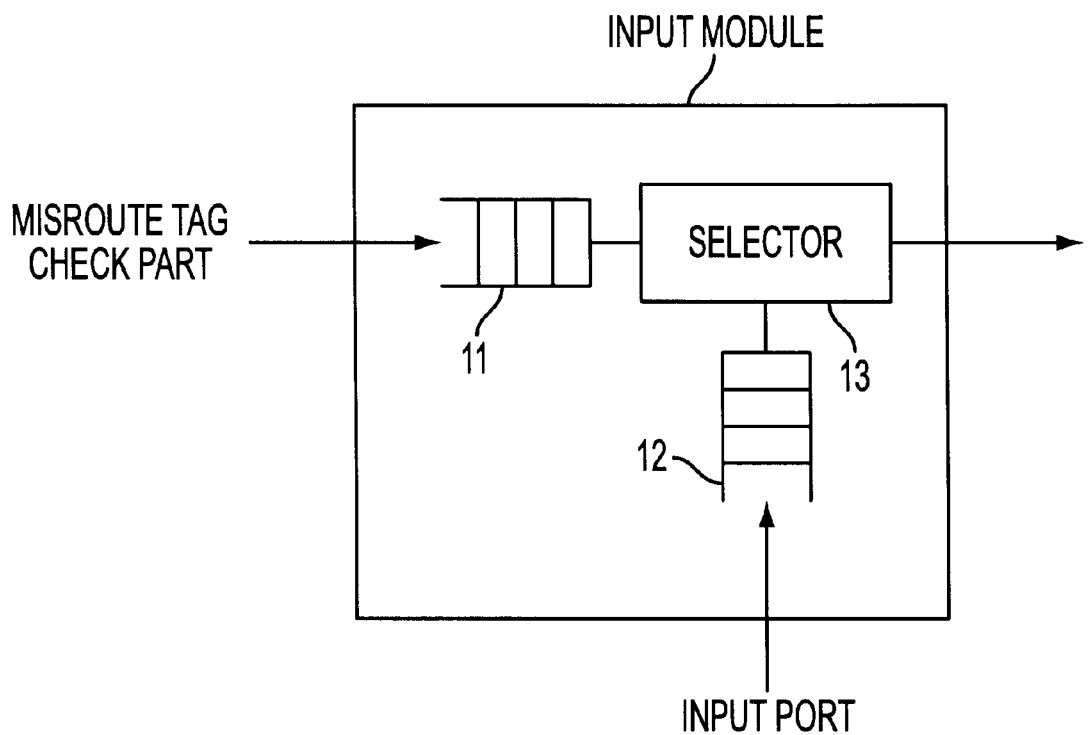
FIG. 8 is a block diagram depicting a detailed construction of an input module of the packet switching system shown in FIG. 6.

As shown in FIG. 8, the input module $IM_h$ comprises first and second FIFO (First In First Out) buffers 11, 12 and a selector 13. The first and second FIFO buffers 11 and 12 store packets sent from an input port $I_h$ and a misroute tag check part $MT_{h,i}$, respectively. The selector 13 selects a packet from either one of the first and second FIFO buffers 11 and 12, and sends the thus selected packet into a Banyan network of a succeeding stage. In this embodiment, it is assumed that a packet from a misroute tag check part $MT_{h,i}$ has a higher priority than a packet from an input port $I_h$. Therefore, when a packet from a misroute tag check part $MT_{h,i}$ is stored in the first FIFO buffer 11, the selector 13 sends this packet into a succeeding Banyan network.

Moreover, when both traffic from an input port $I_h$ and a misroute tag check part $MT_{h,i}$ are 100 percent, the first and second FIFO buffers 11 and 12 might overflow. Therefore, all elements in the Banyan network ring including the input module $IM_h$ and other should be operated at a higher transmission rate than that of the input port $I_h$ by two.

Figure 9:
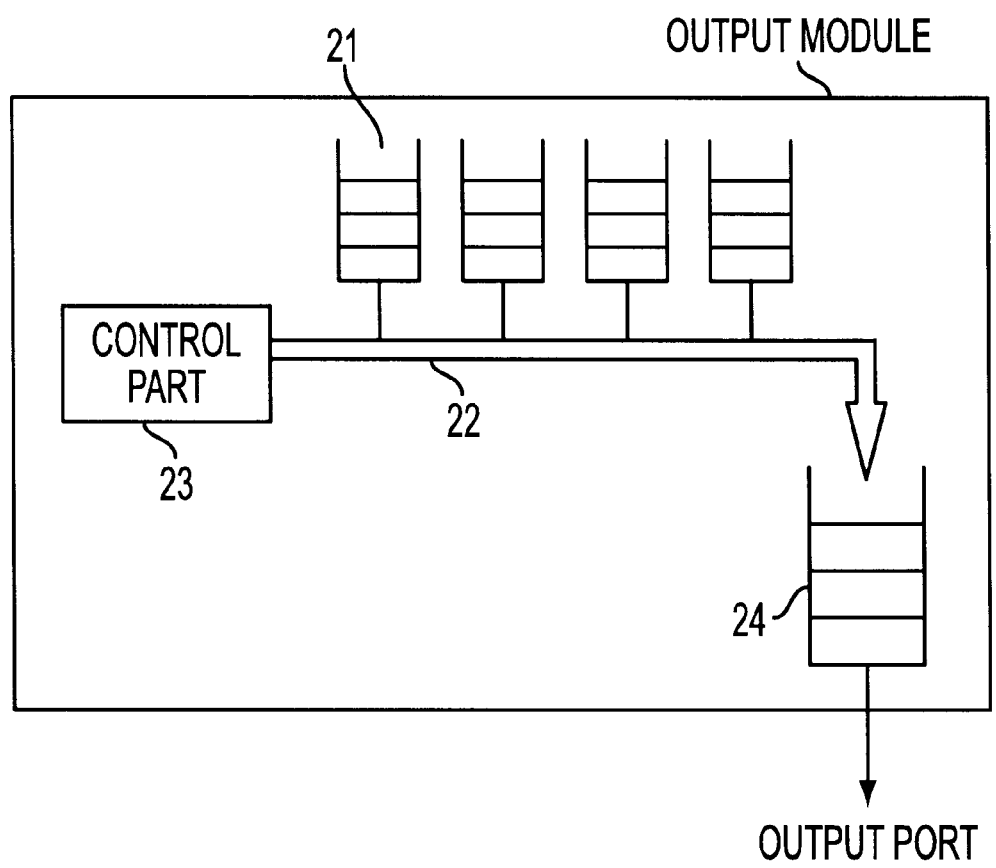
FIG. 9 is a block diagram showing a detailed construction of an output module of the packet switching system shown in FIG. 6.

As shown in FIG. 9, the output module $OM_j$ comprises plural timing control buffers 21, a common bus 22 connected to said timing control buffers, a control part 23 and an output buffer 24. The timing control buffers 21 store packets outputted from respective Banyan networks $B_i$. The control part 23 controls the common bus 22 to give a priority of using the common bus 22 to each of the timing control buffers 21 according to the round robin method. When a timing control buffer 21 gets a priority of using the common bus 22, a packet stored in the relevant timing control buffer 21 is sent to the output buffer 24 via the common bus.

Next a process of switching a packet inputted from an input port $I_h$ to a desired output port $O_j$ will be explained.

First, a packet is inputted to an input port $I_h$ and is stored in a second FIFO buffer 12 provided in an input module $IM_h$ connected to the relevant input module. As stated above, in the input module $IM_h$, a higher priority is given to a packet from the misroute tag check part $MT_{h,i}$ than to a packet from the input port $I_h$, and therefore the packet from the input port is inputted to the Banyan network $B_i$ via the selector 13 only when a packet from the misroute tag check part $MT_{h,i}$ is not stored in the first FIFO buffer 11.

The packet inputted to the Banyan network $B_i$ is switched among the unit switches provided therein. In this case, if an output connected to a desired output port $O_j$ to which the relevant packet is to be destined is occupied, the misroute tag in the packet header is set and the packet is outputted to a non-occupied output, The packet passed through the Banyan network $B_i$ is then sent to a misroute tag check part $MT_{h,i}$ connected to this non-occupied output.

In the misroute tag check part $MT_{h,i}$, it is checked whether the misroute tag of the inputted packet is set or not, and when the misroute tag is set, the relevant packet is sent to a next stage Banyan network. When the misroute tag of the inputted packet is not set, the packet is sent to an output module $OM_j$.

The packet entered into the output module $OM_j$ is stored in the timing control buffer 21 until a priority of usage of the common bus 22 is given. Upon getting the priority, the packet is inputted into the output buffer 24 via the common bus 22 and then is outputted from the packet switching system via an output port $O_j$.

Figure 10:
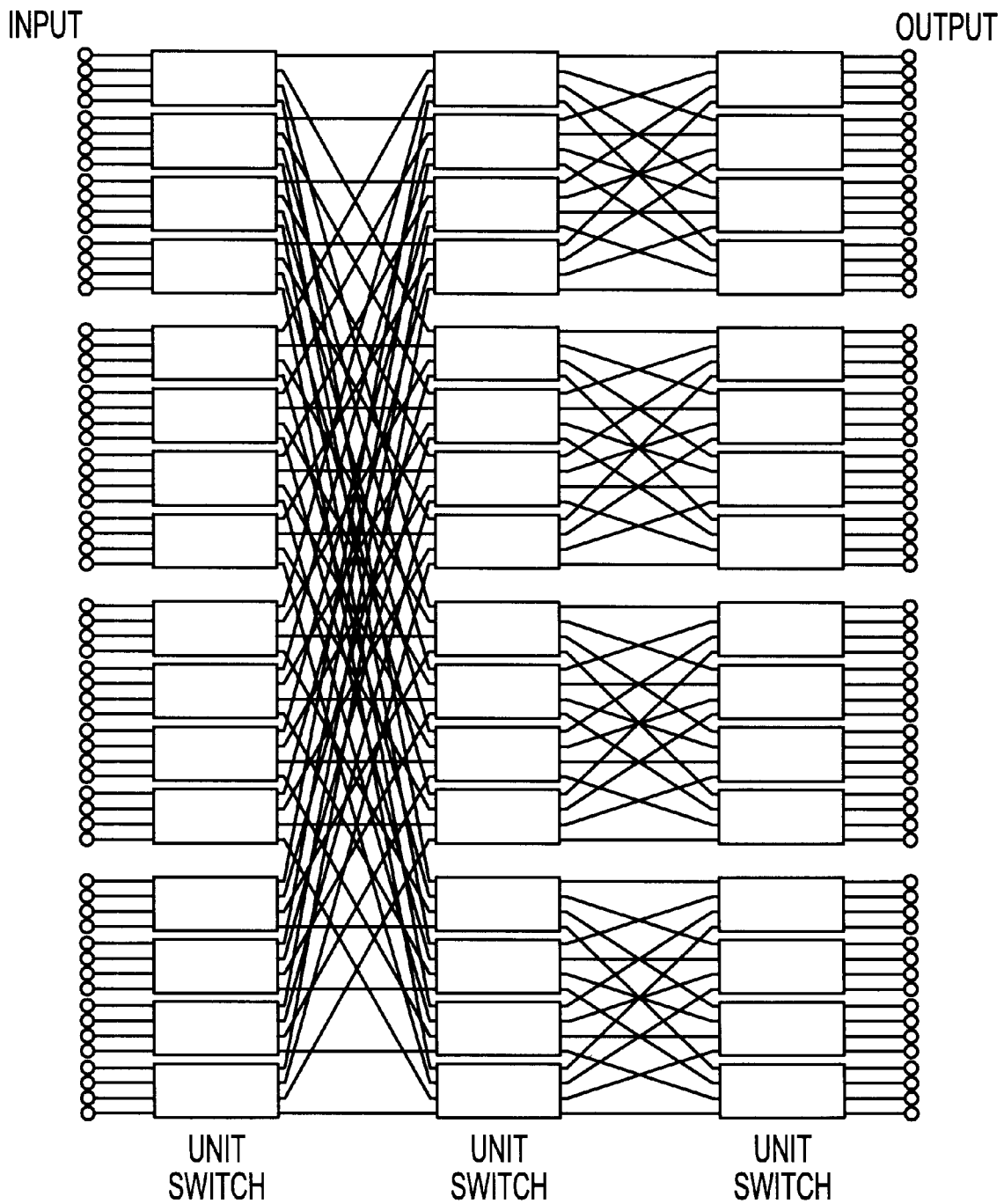
FIG. 10 is a block diagram illustrating a structure of 64×64 Banyan network constructed by 4×4 unit switches.

A performance of the known tandem Banyan network and that of the packet switching system according to the invention have been simulated. In this simulation, it is assumed that the Banyan network is formed by a 64×64 Banyan network using 4×4 unit switches as shown in FIG. 10, a transmission speed of the port is 155.52 Mbps, the input load is 90 percent and the IP datagram is variable length in the range between 21 and 1500 octets.

Figure 11:
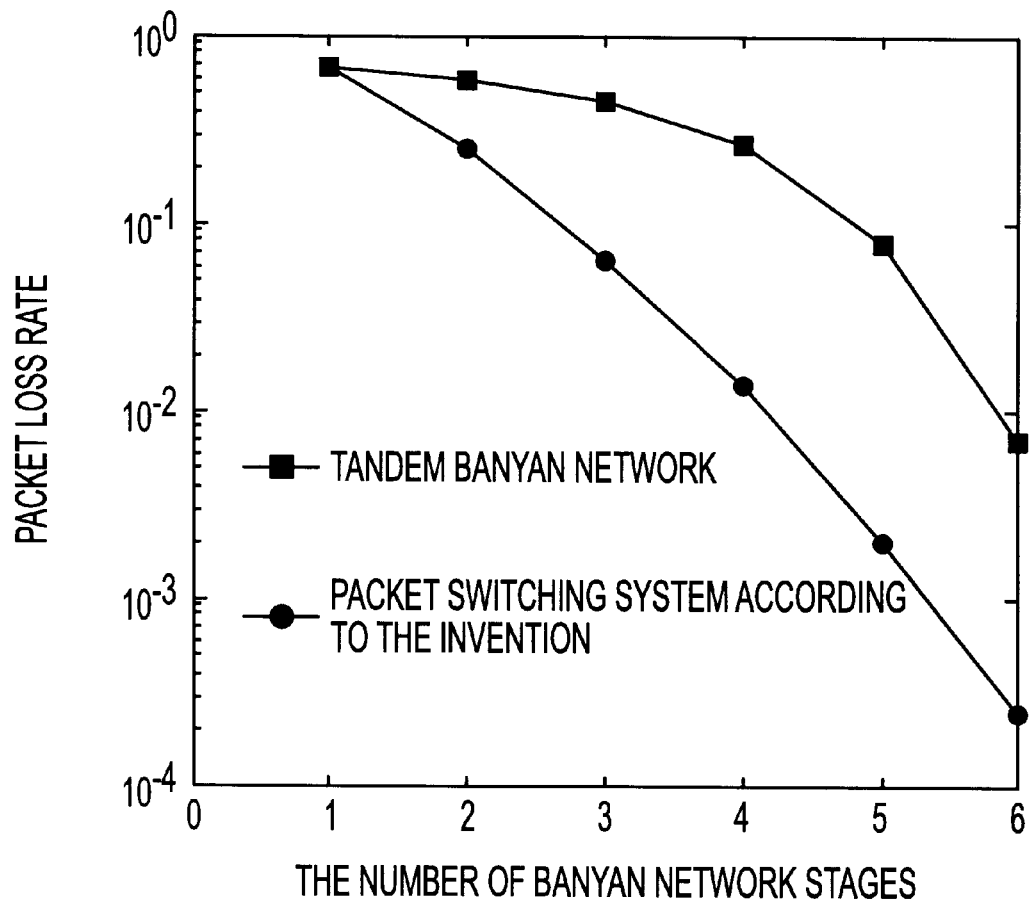
FIG. 11 is a graph showing a relationship between the number of Banyan network plains and a packet loss rate.

FIG. 11 shows a relationship between the number of the Banyan networks and a packet loss rate. As can be seen from FIG. 11, when the number of stages of Banyan networks increases, the packet loss rate decreases in both the known tandem Banyan network and the packet switching system according to the invention, but, in the packet switching system according to the invention, since the input traffic is dispersed, the packet loss rate is lower than that in the tandem Banyan network. Furthermore, the packet loss rate in the packet switching system according to the invention converges faster than the tandem Banyan network, and therefore the high performance can be attained with the smaller number of Banyan network stages. This is a great advantage from a viewpoint of design.

Figure 12:
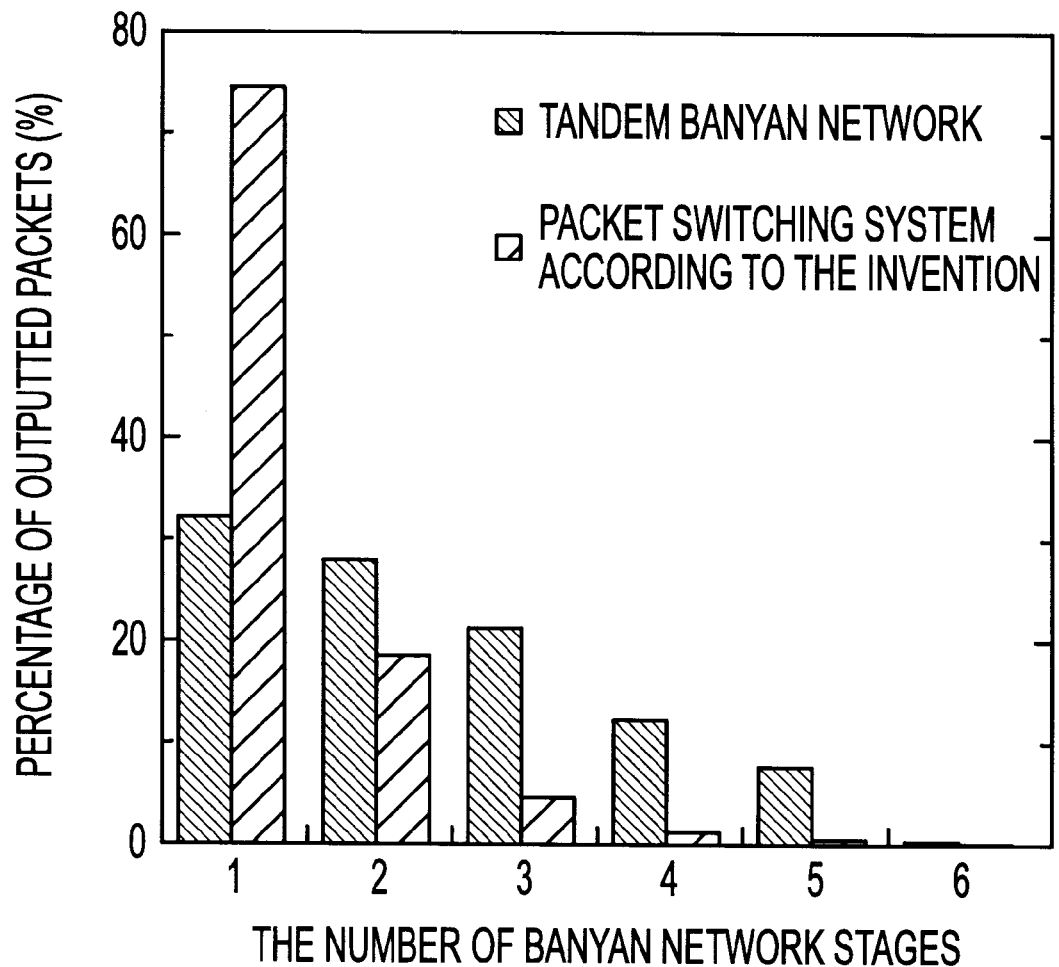
FIG. 12 is a graph representing percentages at which input packets can be outputted at respective Banyan networks.

FIG. 12 shows a percentage of input packets which can be sent to output ports over what number of Banyan networks in the known tandem Banyan network and the packet switching system according to the invention both having six Banyan network stages.

FIG. 12 shows a number of Banyan networks stages through which the input packets travel in the known tandem Banyan network and in the packet switching system according to the invention, both having six Banyan network stages.

What is claimed is:

1. A system for switching high-capacity and variable length packets comprising:

m input ports;

n output ports;

k Banyan networks connected into a ring by means of at least n parallel lines, each Banyan network having at least n inputs and at least n outputs, each of m, n, and k being integers;

m input modules each of which is connected to a respective one of said m input ports, said input modules being further connected to said inputs of said k Banyan networks;

m sets of misroute tag check parts, each set including at least n misroute tag check parts, respective misroute tag check parts in each set being connected to respective outputs of each Banyan network; and n output modules each having an output connected to a respective one of said output ports and inputs each connected to one of misroute tag check parts of each sets;

wherein each of plural unit switches constituting a Banyan network is constructed such that when an input packet cannot be sent to a desired output, the relevant packet is outputted to a non-occupied output of the relevant Banyan network;

said misroute tag check part checks whether a misroute tag of an inputted packet is set or not, and when the misroute tag is set, the relevant packet is sent to a next stage Banyan network, but when the misroute check tag is not set, the relevant packet is outputted to an output module connected to a desired output; and said input module is constructed to store a packet from the input port and a packet from a misroute tag check part and to send one of these packets selectively to a Banyan network of a next stage.

2. A packet switching system according to claim 1, wherein each of said input modules comprises a first FIFO buffer storing a packet from a misroute tag check part, a second FIFO buffer storing a packet from an input port, and a selector selecting one of packets stored in said first and second FIFO buffers and sending a selected packet to a succeeding Banyan network.

3. A packet switching system according to claim 2, wherein a packet from a misroute tag check part has a higher priority than a packet from an input port, and when a packet from a misroute tag check part is stored in the first FIFO buffer, the selector sends this packet to the succeeding Banyan network.

4. A packet switching system according to claim 1, wherein each of said output module comprises timing control buffers storing packets from the Banyan networks, a common bus connected to said timing control buffers, a control part connected to said common bus to give a priority to each of the timing control buffers according to the round robin method, and an output buffer sending a packet on the common bus to an output port.

5. A packet switching system according to claim 1, wherein all elements in the input ports, Banyan networks, misroute tag check parts and output modules are operated at a higher transmission rate than that of a transmission rate of the input ports by two.

* * * * *